(No Model.) 2 Sheets—Sheet 1.

E. TIVEY.
ELASTIC HOSE.

No. 394,227. Patented Dec. 11, 1888.

Witnesses.

Inventor.
Edw. Tivey,
by his attorney,

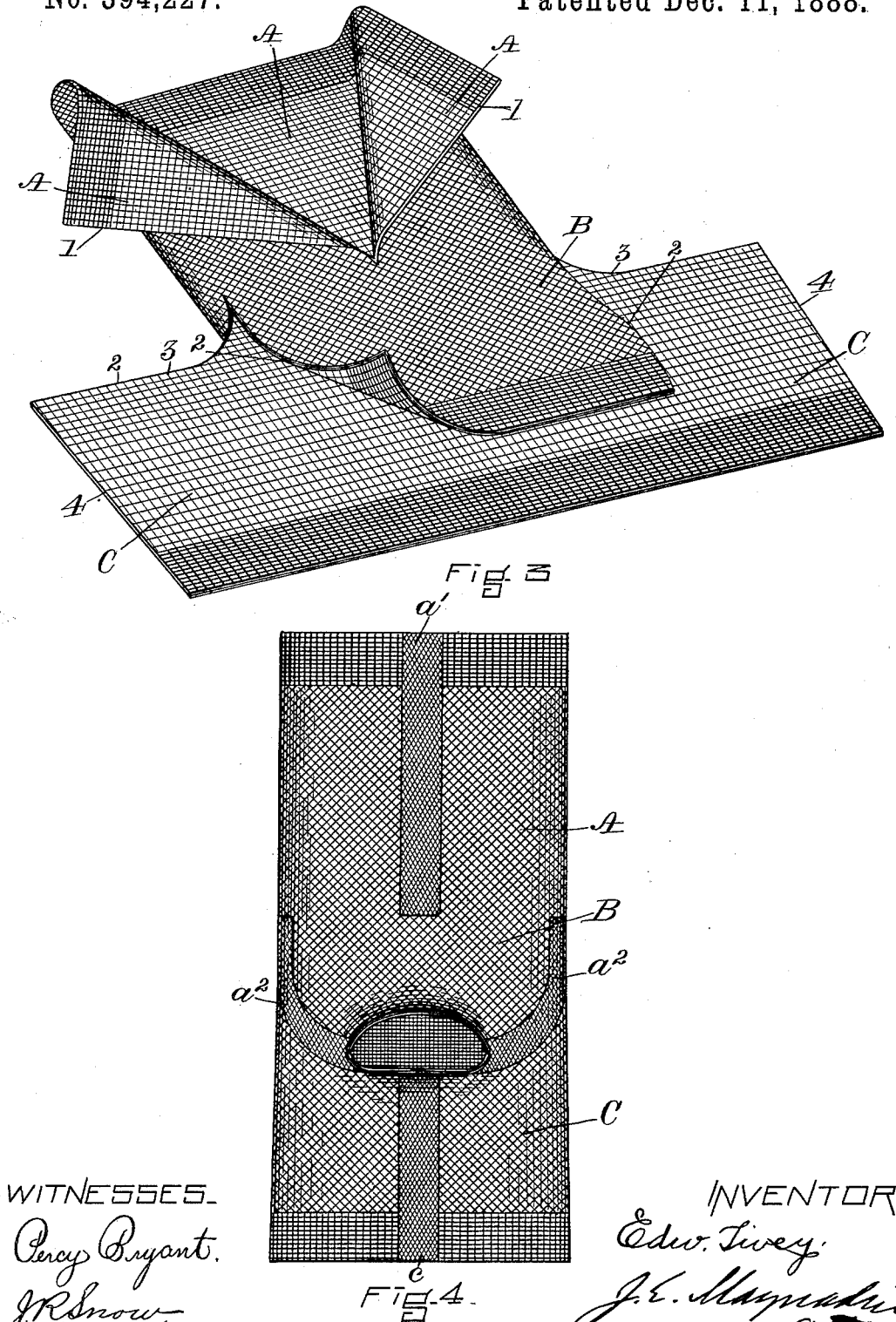

UNITED STATES PATENT OFFICE.

EDWARD TIVEY, OF NEWTON, MASSACHUSETTS.

ELASTIC HOSE.

SPECIFICATION forming part of Letters Patent No. 394,227, dated December 11, 1888.

Application filed October 22, 1884. Serial No. 146,214. (No model.)

*To all whom it may concern:*

Be it known that I, EDWARD TIVEY, of Newton, in the county of Middlesex and State of Massachusetts, have invented a new and useful Improvement in Elastic Hose, of which the following is a specification, reference being had to the accompanying drawings, in which—

Figure 1:
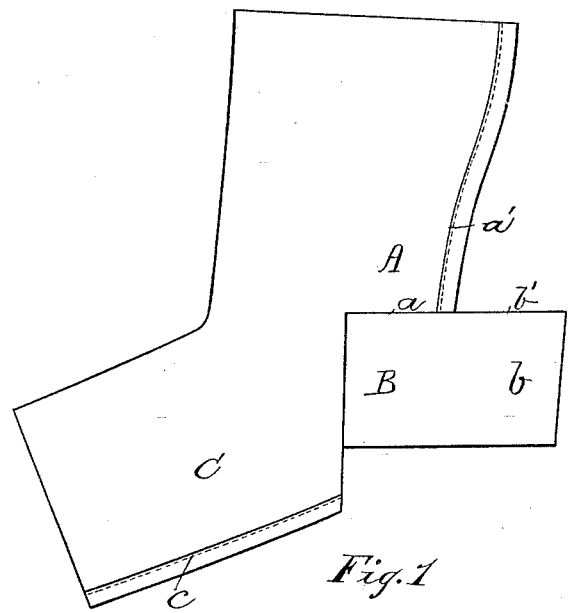
Figure 2:
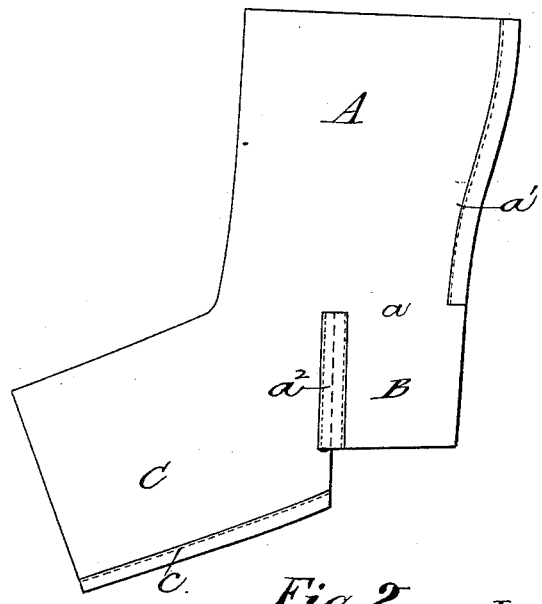

Figure 1 illustrates my patented hose. Fig. 2 illustrates a hose embodying my present invention. Fig. 3 is a perspective view of a blank from which my new hose is made. Fig. 4 shows the back of the leg and heel piece and bottom of the foot of a hose made from the blank shown in Fig. 3.

My invention is an improved hose for varicose veins and the like, and is an improvement on the hose described in my patent, No. 174,711, dated March 14, 1876.

In my patented hose illustrated in Fig. 1 the heel-piece B is a rectangular strip independent of the leg and foot parts A and C, except along a line indicated by $a$, the parts A, B, and C being one flat piece, and secured together to make the finished hose. By my present invention I get rid of the seam at $a$, which seam I have found to be objectionable.

In Figs. 2, 3, and 4, which illustrate a hose embodying my present invention, parts A, B, and C are one piece, as heretofore; but the heel-piece B is united by its entire upper edge to the piece A, and therefore there are but two side seams, $a^2$, required to complete the connection of the heel-piece B with the foot part C.

In making my new hose I weave a blank of substantially the form shown in Fig. 3, and to make the hose secure together the edges 1 1 to form the leg-seam $a'$, edges 2 3 to form side seams, $a^2$, and the edges 4 4 to form the foot-seam $c$, as will be readily understood from Figs. 2 and 4. Seams $a'$, $a^2$, and $c$ are preferably re-enforced by strips of fabric in the usual way, as indicated in the drawings.

Hitherto I have made my hose partly of rubber threads in the usual way; but obviously my new hose may be made in other ways, as desired.

What I claim is—

The improved hose herein described, made from a blank the leg-piece A of which is formed with edges 1 1, which extend from the top of the leg-piece part way toward the heel end of the leg-piece, and which are united to form leg-seam $a'$, the edges 2 2 of whose heel-piece B are united to edges 3 3 of foot-piece C to form side seams, $a^2$, and the edges 4 4 of whose foot-piece C are united to form foot-seam $c$, the heel-piece B being integral with leg-piece A on both sides of leg-seam $a'$, substantially as and for the purpose set forth.

EDWARD TIVEY.

Witnesses:
G. B. MAYNADIER,
JOHN R. SNOW.